(12) United States Patent
Hwang et al.

(10) Patent No.: US 7,116,456 B2
(45) Date of Patent: Oct. 3, 2006

(54) LIGHT MODULATOR MODULE PACKAGE

(75) Inventors: Young Nam Hwang, Kyunggi-do (KR);
Yeong Gyu Lee, Kyunggi-do (KR);
Ohk Kun Lim, Kyunggi-do (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 11/111,457

(22) Filed: Apr. 20, 2005

(65) Prior Publication Data

US 2006/0114582 A1    Jun. 1, 2006

(30) Foreign Application Priority Data

Dec. 1, 2004    (KR)    ........................ 10-2004-0099893

(51) Int. Cl.
*G02B 26/08*    (2006.01)

(52) U.S. Cl. ........................ 359/223; 359/291; 257/433

(58) Field of Classification Search ................ 359/223, 359/224, 245, 290, 291, 566, 573, 850, 856; 257/432, 433; 385/37
See application file for complete search history.

(56) References Cited

U.S. PATENT DOCUMENTS 5,311,360 A    5/1994    Bloom et al.
6,771,859 B1 *    8/2004    Carpenter .................... 385/52

* cited by examiner

*Primary Examiner*—Hung Dang
*Assistant Examiner*—Joseph Martinez
(74) *Attorney, Agent, or Firm*—Christensen O'Connor Johnson Kindness PLLC

(57) ABSTRACT

Disclosed herein is a light modulator module package, which is advantageous because a size of the module package is minimized and heat is efficiently dispersed while the optical properties of a light modulator device are maintained.

4 Claims, 5 Drawing Sheets

LIGHT MODULATOR MODULE PACKAGE

BACKGROUND OF THE INVENTION

1. Field of the Invention

The present invention relates, generally, to a light modulator module package, and more particularly, to a light modulator module package, which has a minimal size and efficiently disperses heat, while maintaining the optical properties of a light modulator device.

2. Description of the Related Art

Recently, micro-machining techniques for fabricating micro-optical components, such as micro-mirrors, micro-lenses or switches, micro-optical sensors, micro-biochips, and-micro-wireless communication devices, using a process of manufacturing a semiconductor device, have been developed. MEMS (Micro-Electro-Mechanical Systems), concerning the micro-machining techniques, and the devices and systems fabricated by such techniques, are regarded as rapidly growing technologies in a broad range of commercial applications.

In particular, the micro-mirror has been commercially applied to large image displays, optical signal distributors, bar-code scanners, or optical signal decay units, or research for commercialization thereof is under study.

FIG. 1 is a perspective view showing a conventional grating light modulator using electrostatic force, which is disclosed in U.S. Pat. No. 5,311,360.

As shown in FIG. 1, a light modulator 10 disclosed in U.S. Pat. No. 5,311,360 has a plurality of equally spaced-apart deformable grating elements 18, each of which includes a light-reflective planar surface and is suspended above a silicon substrate 16. Further, an insulating layer 11 is deposited on the substrate 16, after which a sacrificial silicon dioxide layer 12 is deposited.

The silicon dioxide layer 12 is partially etched in such a way that the grating elements 18 are supported on the silicon dioxide layer 12 by a nitride frame 20.

To modulate light having a single wavelength of $\lambda_0$, the modulator 10 is designed so that the thicknesses of the grating elements 18 and the silicon dioxide layer 12 total one quarter of $\lambda_0$.

The grating amplitude of the modulator 10, which is defined by a vertical distance d between the reflective surfaces of the grating elements 18 and the reflective surface of the substrate 16, is controlled by applying the voltage between the grating elements 18 and the substrate 16.

However, since the light modulator disclosed in U.S. Pat. No. 5,311,360 uses electrostatic force for position control of the micro-mirror, the switching voltage is relatively high (about 3 V) and the relationship between the applied voltage and the displacement is not linear, therefore resulting in unreliable light control.

To overcome the above problems, thin-film piezoelectric light modulators have been proposed.

In this regard, a conventional diffractive thin-film piezoelectric light modulator is shown in FIG. 2.

As shown in FIG. 2, the conventional diffractive thin-film piezoelectric light modulator 100 includes a silicon substrate 101 having a depressed portion, an etching prevention layer 102 formed on the silicon substrate 101, a lower support 111 having both ends of a bottom surface thereof attached to the silicon substrate 101 on both sides of the depressed portion of the substrate 101 to cover the depressed portion of the substrate 101, lower electrode layers 112 and 112' formed on both sides of the lower support 111, piezoelectric material layers 113 and 113' formed on the lower electrode layers 112 and 112', upper electrode layers 114 and 114' formed on the piezoelectric material layers 113 and 113', and a micro mirror 115 formed at a central position on the lower support 111.

As such, it is preferable that such a conventional diffractive thin-film piezoelectric light modulator 100 be modularized to be commercially available. For modularization, various characteristics should be considered.

Generally, in the conventional diffractive thin-film piezoelectric light modulator 100, a drive integrated circuit is manufactured on another substrate and then modularized in hybrid form, rather than being integrated on the same die, resulting in high yields and low fabrication costs. Thus, the light modulator has been preferably manufactured in hybrid form.

However, since the conventional diffractive thin-film piezoelectric light modulator 100 uses light, it cannot utilize the common modularization structure and process unchanged, unlike general devices, and also, it requires specialized components.

In addition, the conventional diffractive thin-film piezoelectric light modulator 100 is disadvantageous because its active device has very low resistance to moisture due to structural properties, and hence, needs to be sealed from the exterior. Further, to stabilize operating properties and increase the lifetime of the device, the diffractive thin-film piezoelectric light modulator 100 should be designed to efficiently disperse heat generated when operating the device and irradiating light.

SUMMARY OF THE INVENTION

Accordingly, the present invention has been made keeping in mind the above problems occurring in the related art, and an object of the present invention is to provide a light modulator module package, which is advantageous because it has minimal size and efficient heat dispersal while maintaining the optical properties of a light modulator device.

In order to accomplish the above object, the present invention provides and light modulator module package, which comprises a printed circuit board (PCB) having an inner circuit and a hole to receive an incident beam of light□ a light transmissive lid attached to the upper surface of the PCB□ a light modulator device formed on the light transmissive lid to correspond to the position of the hole in the PCB so as to modulate the incident beam of light passing through the hole in the PCB to be emitted as diffracted light□ one or more drive integrated circuits formed around the light modulator device to supply a driving voltage to the light modulator device, in response to an externally input control signal□ a connector formed on one side of the PCB to supply the externally input control signal to the drive integrated circuits□ and a molded part to enclose the PCB and the light transmissive lid to hold the PCB and the light transmissive lid.

In addition, the module package further comprises a heat spreader formed on the light modulator device and the drive integrated circuits to disperse heat.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, a detailed description will be given of a light modulator module package according to the present invention, with reference to the appended drawings.

Figure 1:
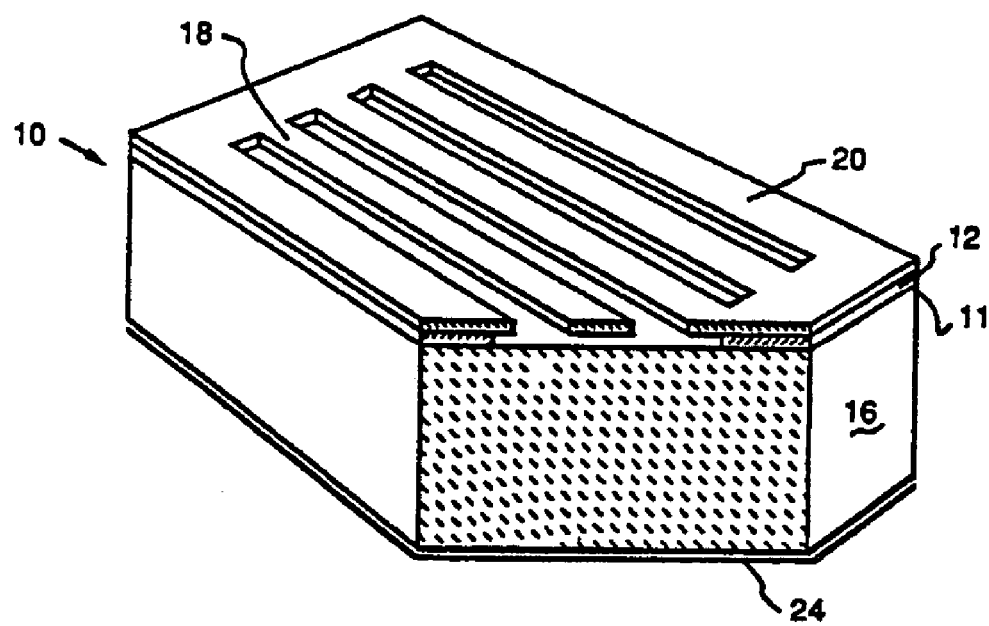
FIG. 1 is a perspective view showing a conventional grating light modulator using electrostatic force□
Figure 2:
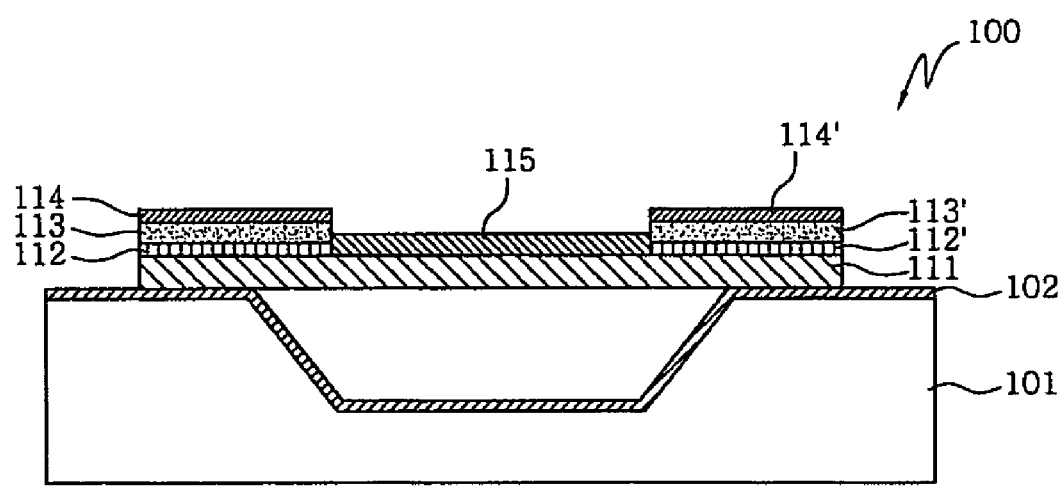
FIG. 2 is a sectional view showing a conventional diffractive thin-film piezoelectric light modulator
Figure 3:
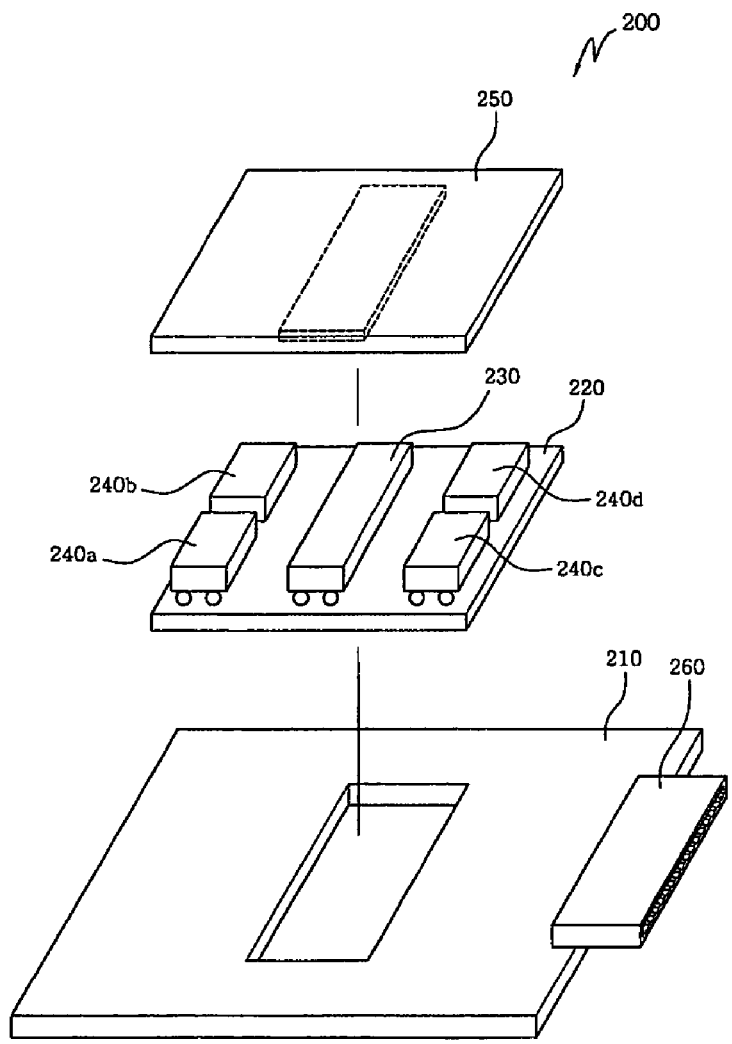
FIG. 3 is an exploded perspective view showing a light modulator module package, according to a first embodiment of the present invention
Figure 4:
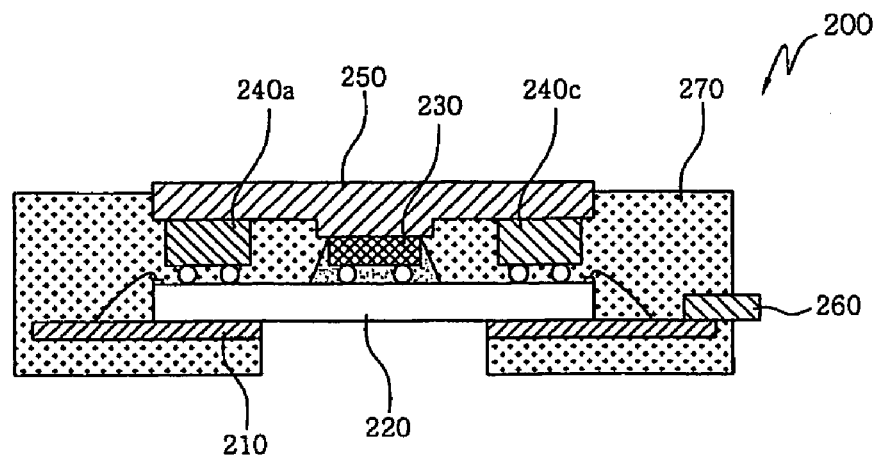
FIG. 4 is a sectional view showing the light modulator module package, according to the first embodiment of the present invention

FIG. 3 is an exploded perspective view showing a light modulator module package, according to a first embodiment of the present invention, and FIG. 4 is a sectional view showing the light modulator module package, according to the first embodiment of the present invention.

As shown in FIGS. 3 and 4, a light modulator module package 200, according to the first embodiment of the present invention, includes a PCB 210, a light transmissive lid 220, a light modulator device 230, drive integrated circuits 240a, 240b, 240c and 240d, a heat spreader 250, a connector 260 and a molded part 270.

The PCB 210 has a hole located such that an incident beam of light is radiated on the light modulator device 230. Also, the PCB 210 has an inner circuit to supply a control signal, which is input through the connector 260 from an external control circuit, to the drive integrated circuits 240a, 240b, 240c and 240d. The PCB 210 is bonded to the drive integrated circuits 240a, 240b, 240c and 240d by means of wires to achieve electrical connection therebetween.

The light transmissive lid 220 is attached to an upper surface of the PCB 210, and is preferably formed of a light transmissive material of high quality to effectively transmit the incident beam of light.

Further, the upper surface of the light transmissive lid 220, which is opposite the surface thereof attached to the PCB 210, is coated with an absorbent film or a scattering film so as to prevent irregular reflection of the incident beam of light from the upper surface of the light transmissive lid 220 by absorbing or scattering the incident beam of light. In addition, to decrease undesired radiation and reflectivity, a non-reflective film may be provided on either surface or both surfaces of the light transmissive lid 220. As such, the absorbent film or the scattering film is formed of black metal.

The light modulator device 230 is formed on the light transmissive lid 220 to correspond to the position of the hole in the PCB 210, and thus, it functions to modulate the incident beam of light passing through the hole in the PCB 210 to be emitted as diffracted light.

The light modulator device 230 is connected to the central portion on one surface of the light transmissive lid 220 through a flip chip, and has a rectangular cross-section which is relatively long in one direction.

The light modulator device 230 is sealed from the exterior using an adhesive, and is electrically connected by the wires provided along the surface of the light transmissive lid 220.

The drive integrated circuits 240a, 240b, 240c and 240d are connected around the light modulator device 230 attached to the upper surface of the light transmissive lid 220 through flip chips, and function to supply the driving voltage to the light modulator device 230, in response to the externally input control signal.

The drive integrated circuits 240a, 240b, 240c and 240d have rectangular cross-sections smaller than the light modulator device 230. The number of integrated circuits may be increased or decreased, if required.

The heat spreader 250 is provided to disperse the heat generated by the light modulator device 230 and the drive integrated circuits 240a, 240b, 240c and 240d. The heat spreader 250 is formed of metal having high heat dispersal efficiency.

As shown in FIG. 4, the drive integrated circuits 240a, 240b, 240c and 240d are formed to be higher than the light modulator device 230. Thus, the heat spreader 250, which serves to disperse the heat generated by the light modulator device 230 and the drive integrated circuits 240a, 240b, 240c and 240d, has a protrusion corresponding to the height of the light modulator device 230. In addition, the surface of the heat spreader 250, which is in contact with the light modulator device 230 and the drive integrated circuits 240a, 240b, 240c and 240d, must be formed to be smooth to assure a secure adhesion therebetween.

The connector 260 is formed on one side of the PCB 210 to supply the externally input control signal to the drive integrated circuits 240a, 240b, 240c and 240d, and is attached to the upper surface of the PCB 210 using an adhesive.

In a preferred embodiment, one side end of the connector 260 protrudes slightly from the side end of the PCB 210.

The molded part 270 encloses the PCB 210, the light transmissive lid 220 on which the light modulator device 230 and the drive integrated circuits 240a, 240b, 240c and 240d are formed, and the heat spreader 250, so as to firmly hold them and protect them from external impacts.

Figure 5:
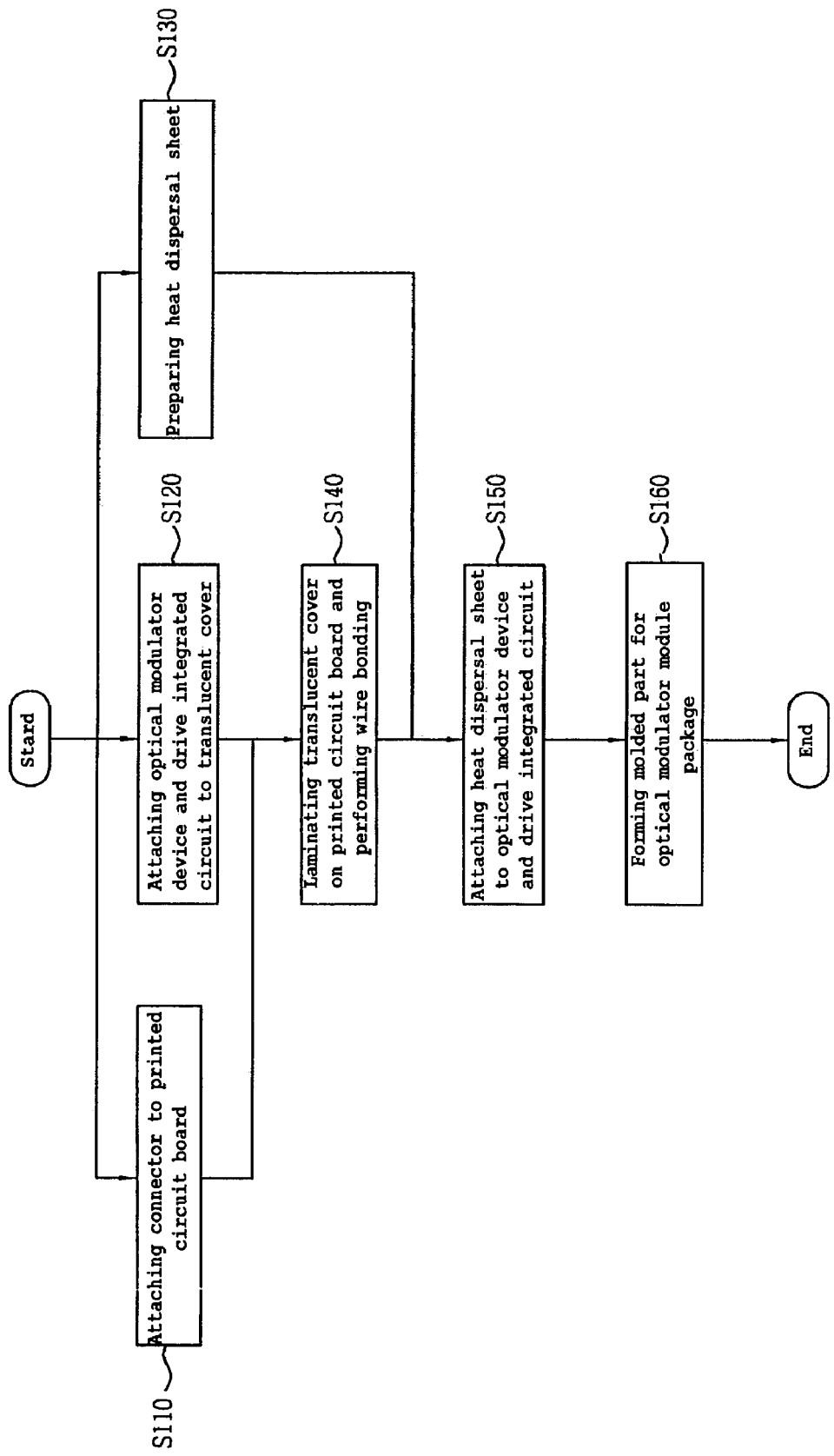
FIG. 5 is a flow chart showing a process of fabricating the light modulator module package, according to the first embodiment of the present invention

FIG. 5 is a flow chart showing a process of fabricating the light modulator module package, according to the first embodiment of the present invention. FIGS. 6a to 6f are sectional views sequentially showing the process of fabricating the light modulator module package of FIG. 5.

As shown in FIG. 5, the process of fabricating the light modulator module package 200, according to the first embodiment of the present invention, includes attaching the connector 260 to the upper surface of the PCB 210 (S110), attaching the light modulator device 230 and the drive integrated circuits 240a, 240b, 240c and 240d to the upper surface of the light transmissive lid 220 (S120), preparing the heat spreader 250 (S130), laminating the light transmissive lid 220 on the PCB 210 and conducting wire bonding (S140), attaching the heat spreader 250 to the upper surfaces of the light modulator device 230 and the drive integrated circuits 240a, 240b, 240c and 240d (S150), and forming the molded part 270 to fabricate a light modulator module package 200 (S160).

Although the attaching of the connector 260 to the upper surface of the PCB 210 (S110), the attaching of the light modulator device 230 and the drive integrated circuits 240a, 240b, 240c and 240d to the upper surface of the light transmissive lid 220 (S120), and the preparing of the heat spreader 250 (S130) may be sequentially performed, it is preferable that they be simultaneously performed in parallel to reduce the total processing time.

Figure 6A:
FIGS. 6a to 6f are sectional views sequentially showing the process of fabricating the light modulator module package of FIG. 5.

Specifically, in FIG. 6a, the PCB 210 having an inner circuit is prepared, one side of which has the connector 260 attached (S110).

Figure 6B:
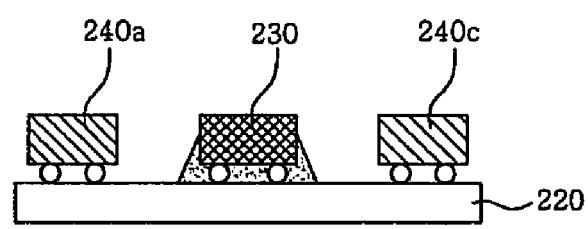

In FIG. 6b, the light transmissive lid 220, which is coated with the absorbent film, the scattering film or the non-reflective film, is prepared, and the light modulator device 230 is attached to the central portion on the coated surface of the light transmissive lid 220, and a plurality of drive integrated circuits 240a, 240b, 240c and 240d is attached around the light modulator device 230 (S120).

Figure 6C:
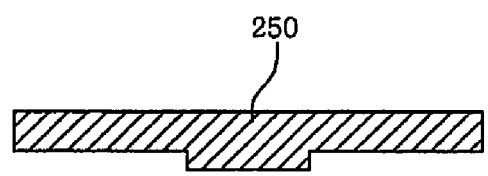

In FIG. 6c, the heat spreader 250, which has a protrusion corresponding to the height of the light modulator device 230, is prepared (S130).

Figure 6D:
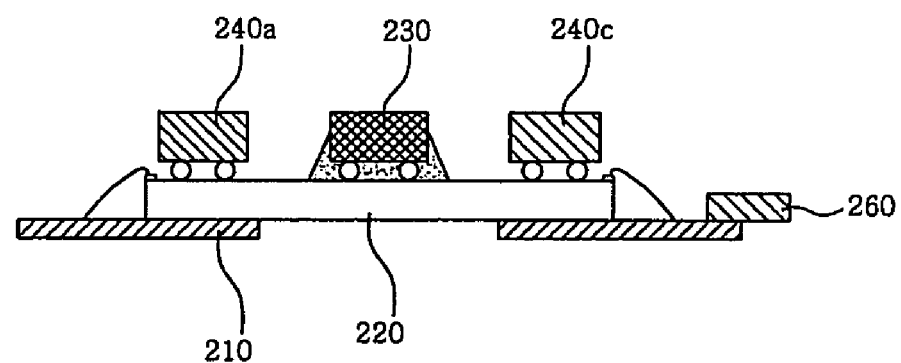

In FIG. 6d, the lower surface of the light transmissive lid 220, which does not have the light modulator device 230 and the drive integrated circuits 240a, 240b, 240c and 240d, is attached to the upper surface of the PCB 210, and then the signal lines of the drive integrated circuits 240a, 240b, 240c and 240d are bonded to the signal line of the PCB 210 by the wires (S140).

Figure 6E:
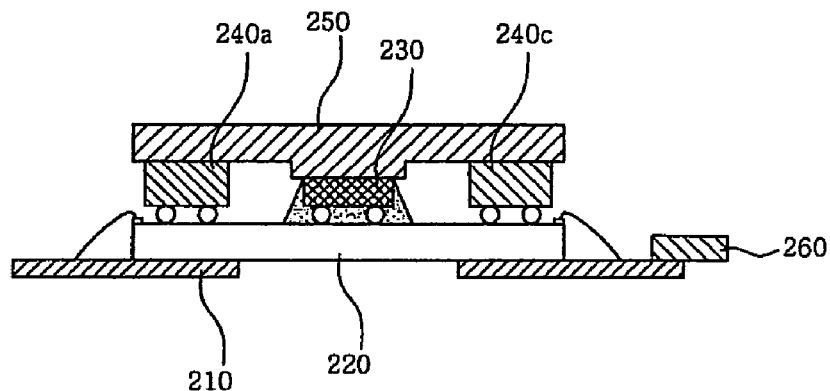

In FIG. 6e, the heat spreader 250 is attached to the upper surfaces of the light modulator device 230 and the drive integrated circuits 240a, 240b, 240c and 240d (S150).

Figure 6F:
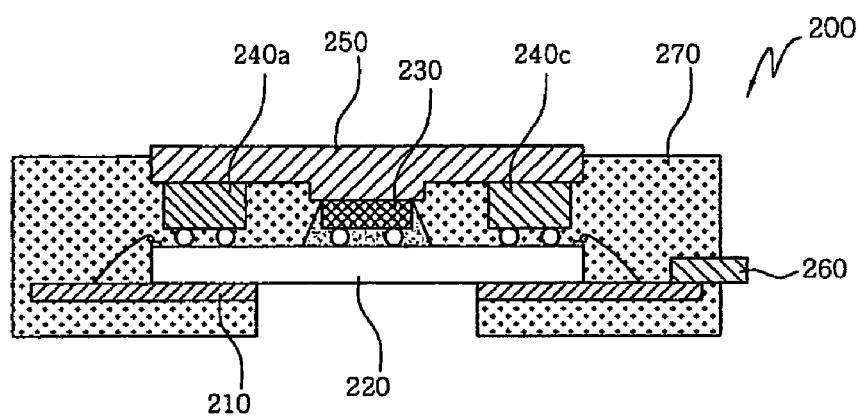

In FIG. 6f, the molded part 270 is formed so that the PCB 210, the light transmissive lid 220 on which the light modulator device 230 and the drive integrated circuits 240a, 240b, 240c and 240d are formed, and the heat spreader 250 are securely held and protected from external impacts, thus obtaining a desired light modulator module package 200 (S160).

Figure 7:
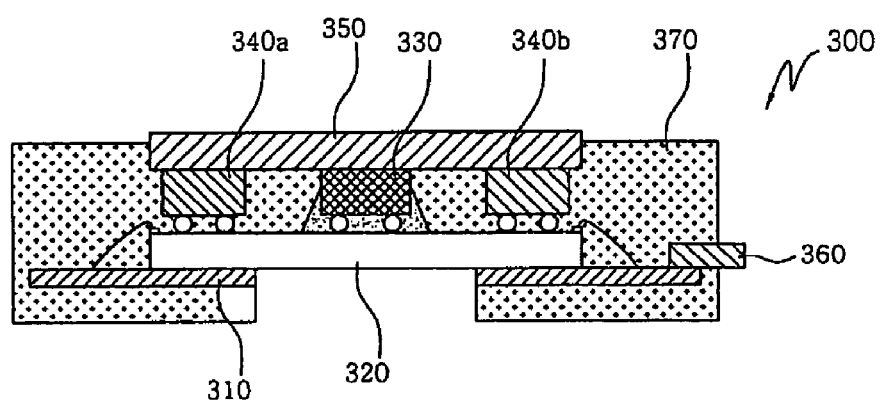
FIG. 7 is a sectional view showing a light modulator module package, according to a second embodiment of the present invention.

Turning now to FIG. 7, there is a sectional view showing a light modulator module package, according to a second embodiment of the present invention.

As shown in FIG. 7, a light modulator module package 300, according to the second embodiment, includes a PCB 310, a light transmissive lid 320, a light modulator device 330, drive integrated circuits 340a and 340b, a heat spreader 350, a connector 360 and a molded part 370.

Compared to the light modulator module package 200 shown in FIGS. 3 and 4, the light modulator module package 300 shown in FIG. 7 is structured in such a way that the light modulator device 330 and the drive integrated circuits 340a and 340b are formed to have the same height, and thus, the entire adhesion surface of the heat spreader 350 is flat.

Therefore, the process of fabricating the light modulator module package 300 shown in FIG. 7 does not require the shaping of the heat spreader 350 to correspond to the heights of the light modulator device 330 and the drive integrated circuits 340a and 340b. Thereby, the fabrication process of the above module package 300 is simplified, and fabrication costs thereof decrease.

As described above, the present invention provides a light modulator module package which is light, slim, short and small.

The light modulator module package of the present invention is advantageous because heat generated by the light modulator device and the drive integrated circuits is effectively dispersed through the heat spreader.

The light modulator module package of the present invention is advantageous because the optical properties of the light modulator device are not reduced when the module package is fabricated.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A light modulator module package, comprising:
a printed circuit board having an inner circuit and a hole to receive an incident beam of light;
a light transmissive lid attached to an upper surface of the printed circuit board;
a light modulator device formed on the light transmissive lid to correspond to a position of the hole in the printed circuit board so as to modulate the incident beam of light passing through the hole in the printed circuit board to be emitted as diffracted light;
one or more drive integrated circuits formed around the light modulator device to supply a driving voltage to the light modulator device, in response to an externally input control signal;
a connector formed on one side of the printed circuit board to supply the externally input control signal to the drive integrated circuits; and
a molded part to enclose the printed circuit board and the light transmissive lid so as to hold the printed circuit board and the light transmissive lid.

2. The module package as set forth in claim 1, further comprising a heat spreader formed on the light modulator device and the drive integrated circuits to disperse heat.

3. The module package as set forth in claim 2, wherein the light modulator device is formed to be lower than the drive integrated circuits, and the heat spreader has a protrusion corresponding to a height of the light modulator device.

4. The module package as set forth in claim 2, wherein the light modulator device is formed to have a same height as the drive integrated circuits, and the heat spreader has a flat adhesion surface to which the light modulator device and the drive integrated circuits adhere.

* * * * *